US006738153B1

(12) United States Patent
Aschenbrenner et al.

(10) Patent No.: US 6,738,153 B1
(45) Date of Patent: May 18, 2004

(54) METHOD, SYSTEM, AND PROGRAM FOR ERROR CHECKING RASTER OBJECTS

(75) Inventors: Jean Margaret Aschenbrenner, Boulder, CO (US); Stephen Dale Hanna, Longmont, CO (US); Phillip Keith Hoskins, Berthoud, CO (US); Steven Gary Ludwig, Broomfield, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/499,722

(22) Filed: Feb. 8, 2000

(51) Int. Cl.$^7$ ............................ G06K 15/00; H04N 1/41
(52) U.S. Cl. .............................. 358/1.14; 358/426.09; 358/3.27
(58) Field of Search ............................ 358/3.04, 3.27, 358/1.14, 1.12, 406, 426.09

(56) References Cited

U.S. PATENT DOCUMENTS

| | | | |
|---|---|---|---|
| 4,928,147 A | 5/1990 | Baumann et al. | 395/288 |
| 5,179,650 A | 1/1993 | Fukui et al. | 397/148 |
| 5,323,312 A | 6/1994 | Saito et al. | 364/419.1 |
| 5,331,579 A | 7/1994 | Maguire, Jr. et al. | 364/578 |
| 5,379,373 A | 1/1995 | Hayashi et al. | 395/148 |
| 5,459,827 A | 10/1995 | Allouche et al. | 395/148 |
| 5,748,789 A | 5/1998 | Lee et al. | 382/243 |
| 5,771,071 A | 6/1998 | Bradley et al. | 348/375 |
| 5,778,100 A | 7/1998 | Chen et al. | 382/243 |
| 5,793,903 A * | 8/1998 | Lopresti | 382/309 |
| 5,796,411 A | 8/1998 | Cyman et al. | 345/502 |
| 5,828,855 A * | 10/1998 | Walker | 395/309 |
| 5,940,585 A | 8/1999 | Vondran, Jr. et al. | 395/114 |
| 6,556,688 B1 * | 4/2003 | Ratnakar | 382/100 |

FOREIGN PATENT DOCUMENTS

SU 1200295 12/1985 ............ G08F/15/20

OTHER PUBLICATIONS

IBM, "Variable Object Space in Mixed Object Document Content Architecture", IBM Technical Disclosure Bulletin, vol. 30, No. 2, Jul. 1987, pp. 903–909.

IBM, "Data Object with Executable Statements to Generate a Panel", IBM Technical Disclosure Bulletin, vol. 37, No. 3, Mar. 1994, p. 583.

A.A.Hanish, et al., "Communication Protocol Design to Facilitate Re–Use Based on the Object–Oriented Paradigm", Mobile Networks and Applications, vol. 2, no. 3, pp. 285–301, 1997 (abstract).

G. Garduno V, et al., "Temporal Linking of Motion–Based Segmentation for Object–Oriented Image Sequence Coding", Signal Processing VII, Theories and Applications. Proceedings of EUSIPCO–94. $7^{th}$ European Signal Processing Conference, Pt. vol. 1, pp. 147–150, vol. 1, published Lausanne, Switzerland, 1994, 3 vol. lxi + 1902 pp. (abstract).

S. Khajenoori, et al., "A Graphics Engine for Design of Three–Dimensional Structures from Standardized Component Modules", Computers & Industrial Engineering, vol. 19, no. 1–4, pp. 117–121, 1990 (abstract).

* cited by examiner

*Primary Examiner*—Jerome Grant, II
(74) *Attorney, Agent, or Firm*—David W. Victor; Konrad Raynes & Victor LLP (57) ABSTRACT

Disclosed is a method, system, and program for error checking raster objects including pixel information for a print job. A plurality of raster objects form the print job. A raster object is received including sequence information indicating an ordering of the raster object with respect to other raster objects in the print job. A determination is made from the sequence information as to whether the raster object is received in a correct order with respect to other raster objects in the print job. This ensures that the pixel information for the raster object is intended for a current pixel line being processed. An indication of error status is made if the sequence information indicates that the raster object was not received in the correct order with respect to the other raster objects in the print job.

28 Claims, 5 Drawing Sheets

| Object Type | First Object on Sheet | Next Object on Sheet | Last Object on Sheet | Last Object in Print Job | Print Blank for Sheet ** |
|---|---|---|---|---|---|
| 10100 | 1 | 0 | 1 | 0 | 0 |
| 10110 | 1 | 0 | 1 | 1 | 0 |
| 10001 | 1 | 0 | 0 | 0 | 1 |
| 01001 | 0 | 1 | 0 | 0 | 1 |
| 10101 | 1 | 0 | 1 | 0 | 1 |
| 10111 | 1 | 0 | 1 | 1 | 1 |
| 01101 | 0 | 1 | 1 | 0 | 1 |
| 01111 | 0 | 1 | 1 | 1 | 1 |
| 01110 | 0 | 1 | 1 | 1 | 0 |

**A blank sheet is printed for value "0" and a blank sheet is not printed for value "1".

FIG. 3

| | Valid Next Object Types | | | | | | | | |
|---|---|---|---|---|---|---|---|---|---|
| Previous Object Type | 10100 | 10110 | 10001 | 01001 | 10101 | 10111 | 01101 | 01111 | 01110 |
| 10100 | Y | Y | Y | N | Y | Y | N | N | N |
| 10110 | N | N | N | N | N | N | N | N | N |
| 10001 | N | N | N | Y | N | N | Y | Y | Y |
| 01001 | N | N | N | Y | N | N | Y | Y | Y |
| 10101 | Y | Y | Y | N | Y | Y | N | N | N |
| 10111 | N | N | N | N | N | N | N | N | N |
| 01101 | Y | Y | Y | N | Y | Y | N | N | N |
| 01111 | N | N | N | N | N | N | N | N | N |
| 01110 | N | N | N | N | N | N | N | N | N |

METHOD, SYSTEM, AND PROGRAM FOR ERROR CHECKING RASTER OBJECTS

BACKGROUND OF THE INVENTION

1. Field of the Invention

The present invention relates to a method, system and program for error checking the ordering of raster objects in processing a print job.

2. Description of the Related Art

To print an image, a print engine processor, referred to herein as a raster image processor, converts the image in a page description language or vector graphics format to a bit mapped image indicating a value to print at each pixel of the image. The bit mapped image is sent to the printer to cause the print heads to print the specified color value at the pixel according to the information in the bit map. If a printer has multiple print heads, such as a print head for different colors, then bit maps are generated for each print head. The print heads overlay the images defined by their respective bit maps onto the print medium.

To produce the bit maps for the print heads, the raster image processor performs numerous transformations on a print image, which may include different types of data, such as line art, e.g., text and graphics, and continuous tone (contone), e.g., images. The raster image processor usually performs operations such as data compression, color space conversion, and halftoning when generating the raster bit map to print. After dissecting a print image into different components, such as color components, text art, contone, etc., the raster image processor must then merge the different elements so that the original image, previously split into different components, is reconstructed for the color plane process.

As newer printers print at ever higher resolutions and speeds, the amount of data needed to generate the print job correspondingly increases. One challenge to optimally process raster print data is to ensure that the raster data is generated and sent to the printer in the proper order so that as a page is passing through the printer, the raster data is sent in the correct sequential order to the printer to print. As printer resolution and print speed increases and the software and compression techniques to print at higher resolutions increase in complexity, the management of the raster components of the print job also increases in complexity.

Thus, there is a need in the art to provide improved methods for managing the raster components of a print job and the order in which they are sent to the printer to ensure that raster components are processed and printed in proper sequential order.

SUMMARY OF THE PREFERRED EMBODIMENTS

To overcome the limitations in the prior art described above, preferred embodiments disclose a method, system, and program for error checking raster objects including pixel information for a print job. A plurality of raster objects form the print job. A raster object is received including sequence information indicating an ordering of the raster object with respect to other raster objects in the print job. A determination is made from the sequence information as to whether the raster object is received in a correct order with respect to other raster objects in the print job. This ensures that the pixel information for the raster object is intended for a current pixel line being processed. An indication of error status is made if the sequence information indicates that the raster object was not received in the correct order with respect to the other raster objects in the print job.

In further embodiments, the sequence information includes object type information indicating whether the raster object is one of a first, next, and last raster objects on a sheet. The print job is comprised of multiple sheets. In such case, the object type information for a previously received raster object is buffered. The object type information from the previously received raster object and the object type information of the current raster object is compared to determine whether the current raster object is received in the correct order. The current raster object is received in the correct order if the object type information indicates that one of the following conditions exist: (i) the current raster object is the first raster object on the sheet and the previous raster object is the last raster object on the sheet; (ii) the current raster object is the last raster object on the sheet and the previous raster object is the first or next raster object on the sheet; (iii) the current raster object is the next raster object on the sheet and the previous raster object is the first raster object on the sheet; and (iv) both the current and previous raster objects are next raster objects on the sheet.

In still further embodiments, raster objects are transmitted to a decompressor to further process after performing the error checking.

In yet further embodiments, each raster object includes pixel information for one color component of a scan line printed by a printer. All the raster objects that include pixel information for the different color components of a same scan line include sequence information indicating that the raster objects of the same scan line are ordered consecutive with respect to each other. The raster objects including the pixel information for the different color components of the same scan line are transmitted to the decompressor after the error checking. Raster objects for the same scan line may be sent to the printer to print before the raster objects of following scan lines are error checked.

Preferred embodiments provide a method, system, and program for processing raster objects representing the color components of a scan line to ensure that all raster components of a scan line are received at the appropriate time. This allows the raster objects to be generated separately and then transferred to separate hardware for further processing and merging. The error checking ensures that raster objects are received in the correct sequence such that a raster object will not be submitted to printing out of order on the wrong scan line.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
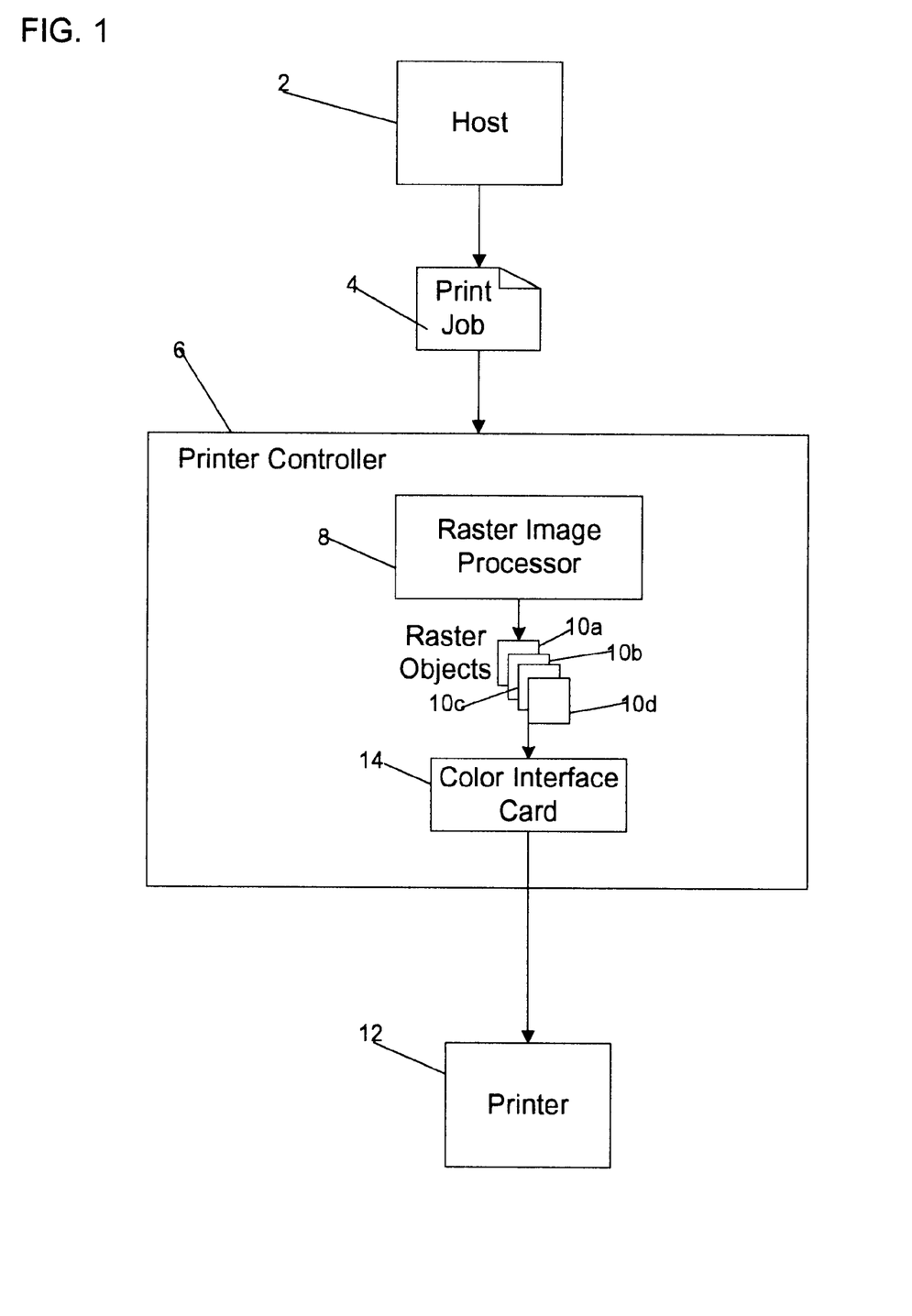
FIG. 1 illustrates a printing environment in which preferred embodiments of the present invention are implemented.

FIG. 1 illustrates a printing environment in which preferred embodiments are implemented. A host computer 2 generates a print job 4 that may include image (contone) and line work (text) components. The host 2 transmits the print job 4 to a printer controller 6 over a cable or network transmission line. The printer controller 6 may comprise a standalone processor or computer, such as the IBM RS/6000 processor. The printer controller 6 includes a raster image processor 8, that is preferably implemented in the RS/6000 main processor and accompanying firmware. In preferred embodiments, the raster image processor 8 generates raster objects 10a, b, c, d including the raster data. Each raster object 10a, b, c, d includes pixel information for one color component of the printer 12. For instance, if the printer 12 prints Cyan (C), Magenta (M), Yellow (Y) and black (K), then there would be one raster object for each color component for a scan line to print. Further, there may be separate raster objects 10a, b, c, d for line art and contone (images), thus providing 8 separate raster objects for each color component of a scan line for the line art and contone components of the line. The printer controller 6 and printer 12 components may be implemented in the same large scale printer, such as the International Business Machines (IBM) Corporation's Infoprint color printers, or with a separate server and standalone printer communicating over a network or attached directly using a serial or parallel port.

**RS/6000 and Infoprint are registered trademarks of International Business Machines Corporation.

Preferred embodiments include a color interface card (CIC) 14 that is preferably implemented on a hardware card, such as a PCI card using Field Programmable Gate Array (FPGA) logic. The CIC card 14 may be inserted in a PCI slot of the backplane of the printer controller 6. The CIC card 14 performs further processing of the raster objects 10 before they are sent to the printer 12 for printing.

In preferred embodiments, raster objects 10a, b, c, d are generated for a sheet. A sheet passes through a printer in a "transport" direction, e.g., the length of the paper. The print heads of the printer 12 deposit print material (e.g., ink) on each scan line, i.e., across the width of the paper. After depositing print material on a scan line, the sheet moves forward in the transport direction to the next scan line of the sheet on which print material is to be deposited. The width along which the print heads deposit material is referred to as the "scan" direction. As discussed, in preferred embodiments, the raster image processor 8 is capable of generating at most four raster line work related objects and four contone related objects for each scan line for each color plane on one side of paper, thereby providing at most eight raster objects per line per color, or in the case of CMYK 32 objects per scan line. Thus, a raster object is generated for each print head of the printer 12, including a C, M, Y, and K heads. In alternative embodiments, including more or fewer print heads, the raster image processor 8 may generate an alternative number of raster objects for each scan line.

Each raster object 10a, b, c, d would be encoded with the following information, which is preferably located in the header.

Sequence Number: On each sheet, each object is assigned a sequence number indicating the order in which it is to be printed with respect to other objects on the sheet. The first object on a sheet has a sequence of number of 0, which is incremented for each subsequent sequence number on a sheet. The sequence number is reset to zero for the first object on the next sheet. Thus, raster objects are to be printed on a sheet according to the ordering of their sequence numbers.

Object Type: Indicates whether an object is the first raster object on a sheet, a last object or a next object, which is any object between the first and last raster object. The object type would also indicate whether the object is the last raster object for the entire print job and whether a blank page is to be printed. In preferred embodiments, the object type is represented by a five bit code, where the first bit indicates that the raster object is the first object on the sheet; the second bit indicates that the raster object is a next object, i.e., following the first object on the sheet; the third bit indicates that the raster object is the last object on a sheet; the fourth bit indicates whether the raster object is the last raster object for the print job; and the fifth bit indicates to print the entire current sheet blank, such as if one of the colors will not appear on the sheet.

Compression type: information on the compression algorithm used to compress the raster object.

Priority level: indicates the priority for objects overlapping the same scan line. Objects with a higher priority are printed preferentially in place of other objects on a per pel basis. Thus, objects for a pel of a higher priority will appear over objects for a pel of a lower priority unless the high priority object is transparent to allow the lower priority object for the pel to appear through the higher priority object. Thus, the priority level indicates the order in which objects overlapping on a scan line are overlaid.

Start and Stop Transport Addresses: Indicates the first and last coordinates the raster object occupies on the sheet in the transport direction.

Start and Stop Scan Addresses: Indicates the first and last coordinates the raster object occupies on the sheet in the scan direction.

Start and Stop Clip: in Transport Direction: Indicates the start and stop in the transport direction of where to clip image. For instance, if the start transport address is less than the start clip address, then the image will be clipped, not printed, for those pixels prior to the start clip address. If the end transport address is greater than the end clip transport address, then the image will also be clipped.

Start and Stop Clip in Scan Direction: Indicates the start and stop in the scan direction of where to clip image.

Address of Next Raster Object In Sheet: Each raster object may include the address of the next raster object to be processed on a sheet. This next address information in each raster object forms form a linked list of all sequential raster objects on a sheet.

Figure 2:
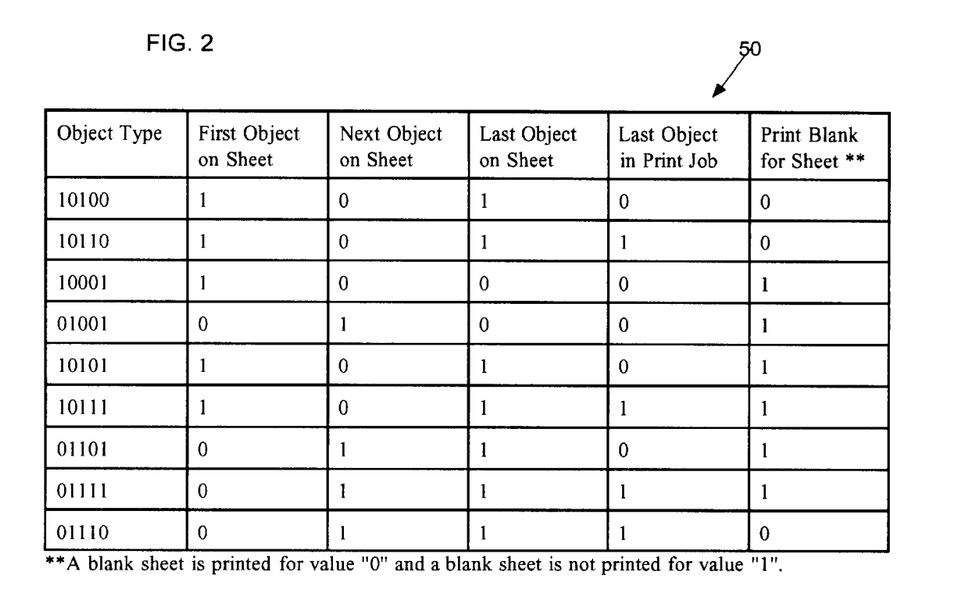
FIG. 2 illustrates permissible object types for raster objects in accordance with preferred embodiments of the present invention.

FIG. 2 illustrates an object type table 50 including valid object type values for a raster object and the meaning of each bit in the object type value. The first three bits are used to indicate whether the raster object is the first, last or next object on a particular sheet. An object may have two bits of the first three "on" (e.g., 1). For instance, a raster object may be both a first and last object on the sheet, i.e., the only object for the sheet. The "last object in print job" bit indicates whether the object is the last object for the job and the "print blank sheet" bit indicates whether the entire sheet will be printed blank. A "0" value for the last bit indicates to print a blank sheet so that nothing will be printed on the current sheet, whereas a value of "1" indicates that the null is not used to print a blank sheet. However, there may be raster objects including pixel information following a sheet printed blank. Below is the meaning of each object type listed in the object type table 50:

"10100": indicates that the object is both the first and last object on the current sheet, i.e., the only object on the current sheet, the object is not the last object in the job, and the sheet should be printed blank (i.e., the current object has no pixel information to print). However, there are objects on subsequent sheets as the object is not the last in the job.

"10110": indicates that the object is both the first and last on the sheet, i.e., the only object on the current sheet, the last object in the job, and the sheet should be printed blank as the current object has no pixel information to print.

"10001": indicates that the object is the first on the sheet and that there will be further objects as it is not also the last object on the sheet to print and the object is not the last in the job.

"01001": indicates that the object is the next on the sheet and that there will be further objects on the sheet as it is not also the last object on the sheet and not the last in the job.

"10101": indicates that the object is both the first and last on the sheet, i.e., the only object on the current sheet, the object is not the last in the job, and the sheet will not print blank, i.e., the current object has pixel information to print.

"10111": indicates that the object is both the first and last on the sheet, i.e., the only object on the current sheet, the object is the last in the job, and the sheet will not print blank, i.e., the current object has pixel information to print.

"01101": indicates that the object is both the next and last on the sheet, i.e., there is at least one previous object on the current sheet, the object is not the last in the job, and the sheet will not print blank, i.e., the current object has pixel information to print.

"01111": indicates that the object is both the next and last on the sheet, i.e., there is at least one previous object on the current sheet, the object is the last in the job, and the sheet will not print blank, i.e., the current object has pixel information to print.

"01110": indicates that the object is both the next and last on the sheet, i.e., there is at least one previous object on the current sheet, the object is the next and last on the sheet, i.e., there are at least two objects on the sheet, and the remainder of the sheet will print blank. This object is not an actual object type, and is instead added for hardware implementation purposes.

A valid null object is one that has the last bit "on". A valid object following a null object must be the first object on the next sheet. In preferred embodiments, there is only one null object per page. A null object is used to indicate that a blank page is to be printed. It may have data which is ignored or no data at all, depending on the hardware implementation. A valid null object must be the only object on the sheet, i.e. the "first of sheet" and "last of sheet"; bits must both be active. It may or may not be the last object of the job. (Note that in certain implementations 01110 is a special null object which will never be used in real printing but which enables easier hardware implementation.)

Figure 3:
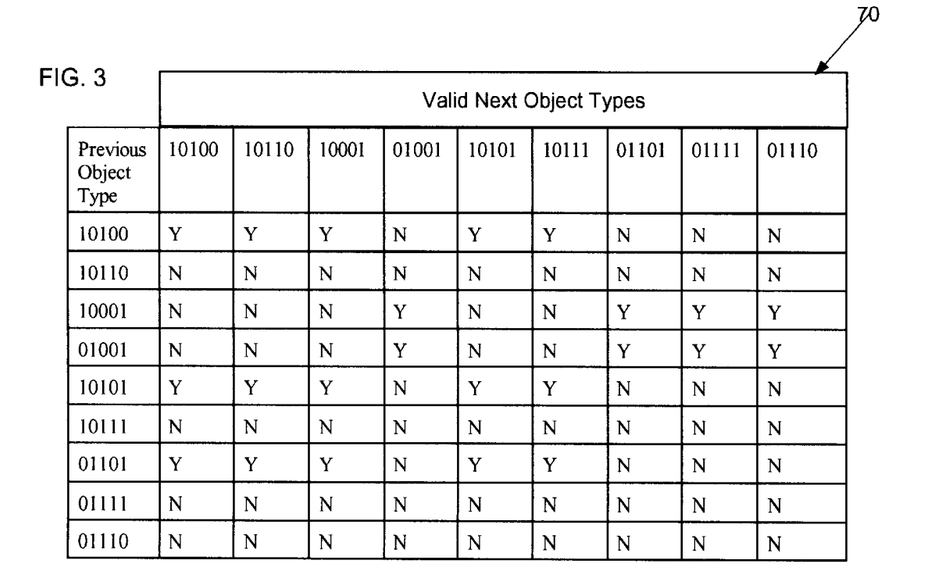
FIG. 3 illustrates a table used in determining whether a current raster object is in proper sequential order in accordance with preferred embodiments of the present invention.

FIG. 3 illustrates a valid object table 70 that indicates the valid next object type based on the previous object type of the preceding raster object. A "Y" in the valid object table 70 indicates that in the same row one of the next object types listed in the second to last columns may follow the previous object type in the first column. For instance, if the previously considered object had an object type of "10100", in the first row of table 70, then the previous object was the first and last object on the sheet and there are further objects and sheets in the job as the object is not the last in the job. In such case, the next object may be a first object on the sheet, and not a next or last object as indicated by the "N"s in the "01001", "01101", and "01111" columns. If the object type is "10001", then the object is the first, but not the last on the sheet or in the job. In such case, the following object type must be a next object on the sheet, i.e., an "01001", "01101" or "01111" object type as indicated by the "Y" (Yes") values in these columns for the "10001" row. When a job is initiated, the old object type is set to 10100. This initial condition allows proper error checking of the first object.

The raster image processor 8 assigns the object types to the raster objects 10a, b, c, d depending on the order in which they are supposed to be printed on a sheet in a print job. This insures that all objects for a given scan line are printed together on the same scan line and not presented on a later or earlier scan line.

In addition to encoding the object type value in each raster object 10a, b, c, d, the raster image processor 8 further encodes a sequence number with the raster object. The first object on each sheet has a sequence number of 0. In preferred embodiments, the valid object table 70 is encoded in the CIC card 14 for use during object error and sequence checking to ensure that the raster objects are being received from the raster image processor 8 in the correct order so that objects are printed on the correct scan line as the sheet is moving forward through the printer 12.

Figure 4:
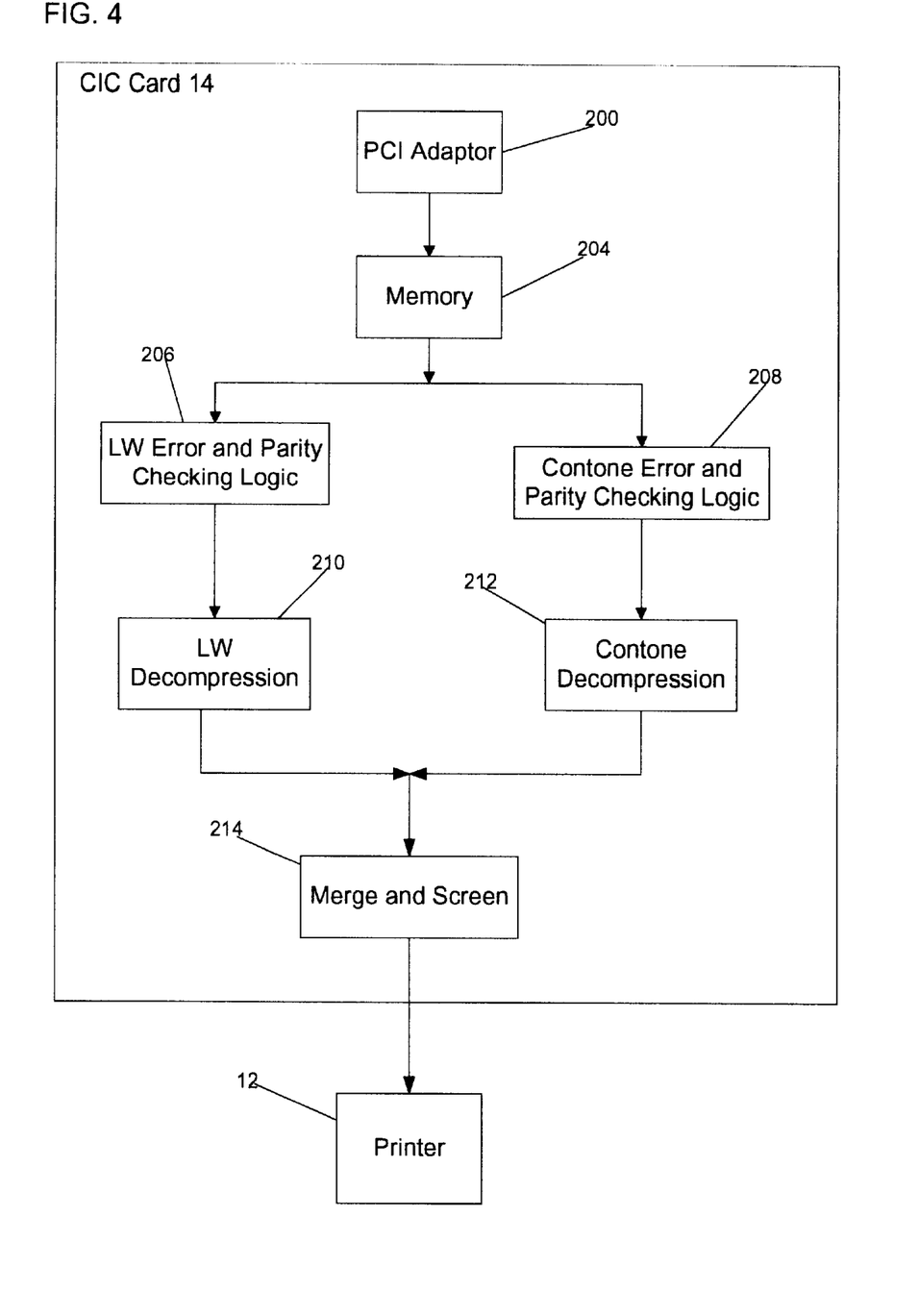
FIG. 4 illustrates a hardware architecture to process print data in accordance with preferred embodiments of the present invention.

FIG. 4 illustrates further details of the logical components within the CIC card 14. The CIC 14 card includes PCI adaptor 200 logic to interface with the raster image processor 8, as the CIC card 14 is preferably implemented as a PCI card. Memory 204 buffers and stores data, such as raster objects 10a, b, c, d, received from the raster image processor 8. The raster image processor 8 generates raster objects to include data for either line work, such as text, or contone, such as images as pictures. In preferred embodiments, the CIC card 14 includes separate logic for handling the line work and contone raster objects separately with separate error and parity checking logic 206 and 208 and separate decompression logic 210 and 212, respectively. From memory 204, the raster objects 10a, b, c, d are transferred to either the line work (LW) error and parity checking 206 or contone error and parity checking 208 logic. After the raster objects are decompressed and further processed, such as overlaid and clipped, then they are sent to the merge and screen 214 logic to produce a single bit map for a scan line.

In preferred embodiments, sequence numbers are maintained separately and checking is performed separately for line work and contone raster objects. However, because the CIC card receives raster objects in order, the line work and contone raster objects for a scan line would be received concurrently by the separate line work 206, 210 and contone 208, 212 logic components for decompression and processing.

Figure 5A:
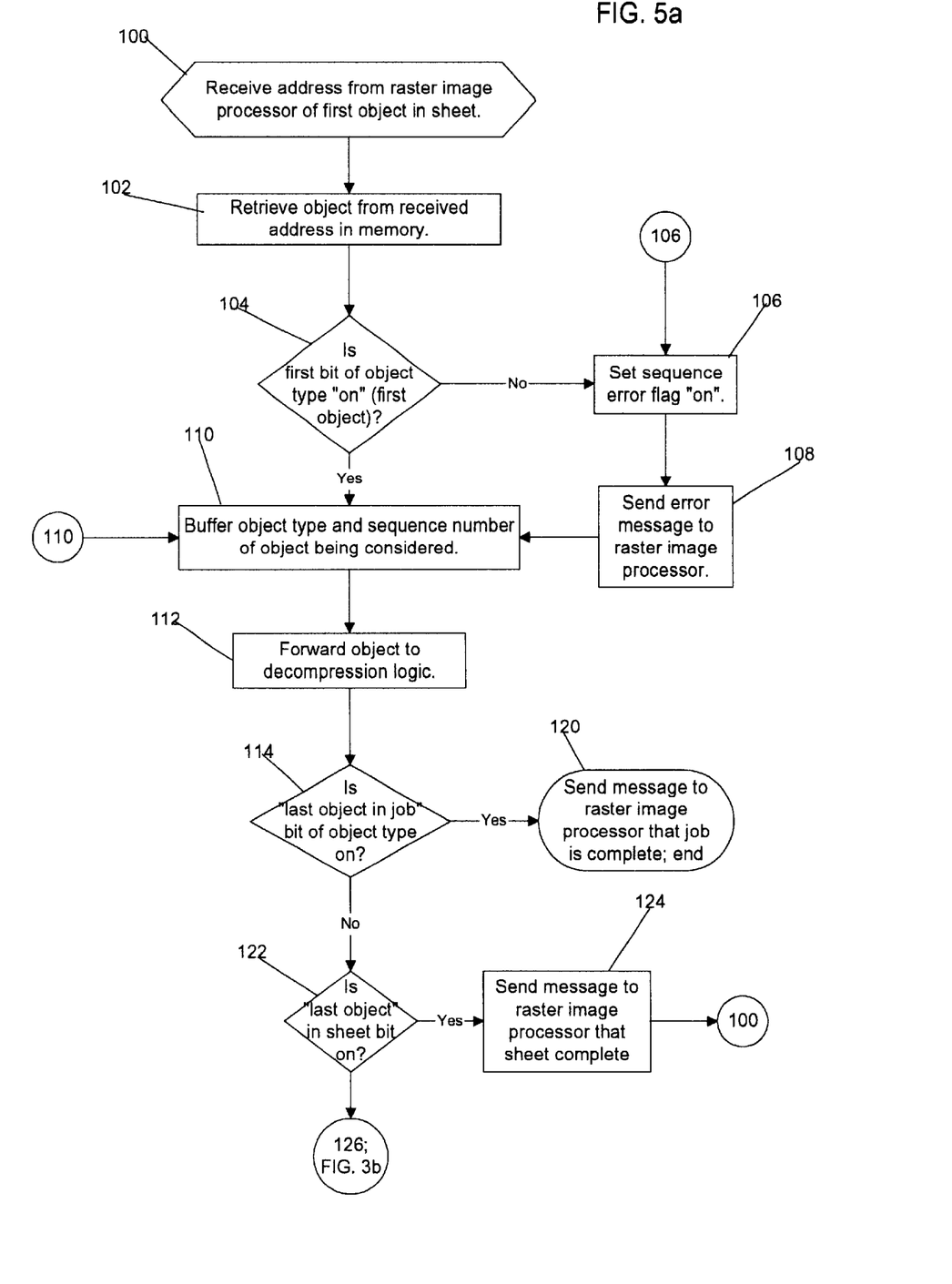
FIGS. 5a and 5b illustrate logic implemented in the hardware of FIG. 4 for determining whether raster objects are received in the proper order in accordance with preferred embodiments of the present invention.
Figure 5B:
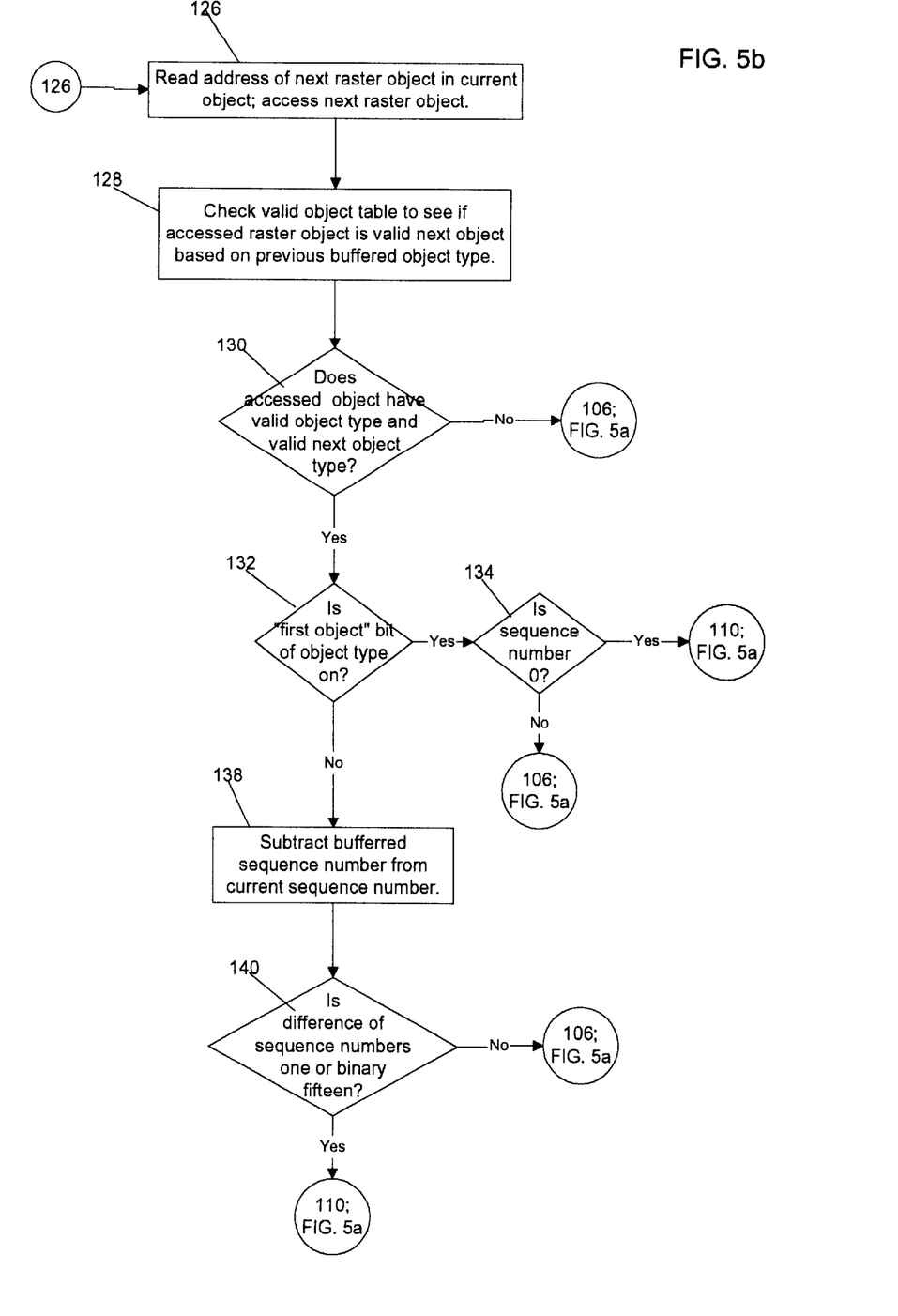

FIGS. 5a, b illustrate logic implemented in the CIC card 14 and, in particular the LW 206 and contone 208 error and parity checking logic to determine whether the raster objects are received in the correct sequence and take appropriate action if a raster object is received out of sequence. Control begins at block 100 with the PCI adaptor 200 receiving the address of the first object in a sheet in the current print job from the raster image processor 8. The CIC card 14 then retrieves (at block 102) the raster object at the received address from a memory used by the raster image processor 8, preferably external to the CIC card 14. In preferred embodiments, the PCI adaptor 200 prefetches objects and places them in memory 204. As the objects are accessed from the memory 204 and sent to the error and parity checking logic 206, 208, the PCI adaptor 200 would prefetch more objects. The PCI adaptor 200 would determine the next object to fetch from the address of the next object in the sheet field in the header of the last retrieved object. The error and parity checking logic 206, 208 then determines whether the first bit of the object type field is "on," i.e., that the object retrieved from the raster image processor 8 is a first object on a sheet. If not, then the error and parity checking logic 206, 208 sets (at block 106) a sequence error flag "on" and sends (at block 108) an error message to the raster image processor 8 indicating a sequence error. The raster image processor 8 may then determine the corrective action. Typically, if an error is detected, the raster image processor 8 would print blank pages and an error mark, and then restart the job right after the last successfully printed sheet or page. The pages printed in error may be removed later either manually or mechanically. Other printers can stop printing before the objects having the sequence errors are printed. To reprint after error, the raster image processor 8 regenerates the objects for the page following the last successfully printed page. Other error handling techniques known in the art may be used.

After sending the error message (at block 108) or if the first bit of the object type is "on", then the error and parity checking logic 206, 208 buffers (at block 110) the object type and sequence number of the current raster object and then transfers the raster object to the decompression logic 210, 212 for further processing. In the preferred logic, even if there is a sequence error, the objects are still transferred to the decompression logic 210, 212 for further processing.

After sending the current raster object to the decompression logic 210, 212, the CIC card 14 logic then determines whether the "last object in job" bit is "on", which is the fourth bit in the object type field as shown in FIG. 2. If so, then there are no more objects to process for this print job, and the error and parity checking logic 106, 208 sends (at block 120) a message to the raster image processor 8 that the job is complete and ends. If the "last object in job" bit is not "on", then the CIC card 14 logic determines (at block 122) whether the "last object on the sheet" bit is "on". If so, then the sheet has completed, and the CIC card 14 logic sends a message (at block 124) to the raster image processor 8 that the sheet has completed and returns to block 100 to receive the address of the first raster object on the next sheet of the print job. Upon receiving indication that a sheet has completed printing, the raster image processor 8 may then delete the raster objects for the completed sheet from memory. If the "last object on sheet" bit is not "on", i.e., there are further raster objects for the current sheet, then the next object is obtained (at block 126 in FIG. 5b) from the memory 204. As discussed, in preferred embodiments, the PCI adaptor 200 prefetches objects into the memory 204 using the address information for the next raster object maintained in the current raster object and accesses such object from the memory used by the raster image processor 8. The objects for the next several sheets may be prefetched well ahead of completion of the objects on the actively printing sheet.

After accessing the next raster object, the error and parity checking 206, 208 logic checks (at block 128) the valid object table 70 to determine if the accessed raster object is a valid object and valid next object type using the buffered object type as the previous object type. The valid object table 70 may be implemented in the error and parity checking logic 206, 208. If (at block 130) the accessed object does not have a valid object type, then control transfers to block 106 in FIG. 5a to send the error message before processing the next raster object. Otherwise, if the object type of the accessed raster object is valid, then the error and parity checking 206, 208 logic determines whether the "first object" bit of the object type field is "on". If the raster object is the first object, then the error and parity checking logic 206, 208 determines (at block 134) whether the sequence number is zero for the first raster object on the sheet. If so control transfers to block 110 in FIG. 5a to process the next raster object and skip any error related operations as a zero sequence number is correct for the first raster object on the sheet. If the sequence number is not zero, then there is an error as the first object on a sheet should have a sequence number of zero and control transfers to block 106 in FIG. 5a to perform the sequence error related operations before proceeding to process the next raster object.

If the accessed raster object is not the first object on the sheet, then the error and parity checking logic 206, 208 checks if the current sequence number of the accessed raster object correctly follows the sequence number of the previous processed raster object by subtracting (at block 138) the sequence number of the buffered raster object of the previously precessed raster object from the current sequence number. If the difference of the sequence numbers (at block 140) is one or binary negative fifteen (in the case that there are a maximum number of sixteen sequence numbers on a sheet and the sequence number counter turns over, such that the buffered previous raster object has a sequence number of fifteen and the next object has a sequence number of zero) then the raster object numbers are in correct order and control transfers to block 110 in FIG. 5a to send the raster object to the decompression 210, 212 logic and consider the next raster object. If the difference is not one or binary fifteen, i.e., the raster objects are received out of sequence, then control transfers to block 106 in FIG. 5a to perform sequence error operations before proceeding to the next raster object. If there are a different number of sequence numbers, then a difference of one or the binary value of the number of sequence numbers indicates that the sequence order of the objects is correct.

Thus, the error and parity checking logic of the preferred embodiments ensures that line work and contone raster objects are received in the correct order. The parity checking component of the error and parity checking logic 206 and 208 would use parity to check whether the header information in the object is correct. After checking the parity of the object header, the logic 206 and 208 would then check whether the object was received in an appropriate sequence order. If raster objects are not received in correct order, then the sequence error is noted and the raster image processor 8 may take corrective action to redrive the printing of the sheet in which the sequence error occurred.

In preferred implementations, there may be four line work and four contone raster objects per scan line for each color component handled by the printer 12. After the decompression logic 210, 212 receives and processes four objects, four for each color component for the scan line, then those objects for the scan line may be transferred to the merge and screen 214 logic where the line work and contone raster objects are combined into a bit map representing pixel information for all the line work and contone components that are on the scan line. Thus, the merge and screen logic 214 would merge the contone and line work components, implemented in the raster objects, for each color component of the scan line.

In preferred embodiments numerous raster image processing operations such as checking the ordering of the raster objects, decompression and merging functions, among others, are implemented in hardware separate from the printer controller 6 CPU, in which the raster image processor 8 is implemented. This architecture reduces processing burdens on the printer controller 6 CPU, which can be significant. Further, the hardware logic of the CIC card 14 can typically perform the decompression, overlaying, and merge and screen raster operations faster than the printer controller 6 CPU operating under program control. The preferred error and parity checking logic ensures that print objects for a sheet are received in the correct sequence to ensure that raster objects for scan lines other than the current scan line being processed are not received out of order, but are received when their respective scan line is being processed.

By processing raster objects in sequence, all the raster objects for a scan line can be sent to the printer to allow the scan line to be printed before raster objects are received for subsequent scan lines. The preferred error and parity checking logic ensures that scan lines will not be printed out of order, thereby allowing earlier scan lines to be printed before the raster objects for subsequent raster objects are received and processed. This arrangement increases the speed of the printing process by immediately transmitting raster data for a scan line to the printer for printing even though there is still raster data to process. This is particularly advantageous for large scale print jobs to allow the printer 12 to begin printing the job as soon as possible and minimize any raster image processing delays.

Alternative Embodiments and Conclusions

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof The term "article of manufacture" (or alternatively, "computer program product") as used herein is intended to encompass one or more computer programs and/or data files accessible from one or more computer-readable devices, carriers, or media, such as magnetic storage media, "floppy disk," CD-ROM, optical disks, holographic units, volatile or non-volatile electronic memory, a file server providing access to the programs via a network transmission line, wireless transmission media, signals propagating through space, etc. Of course, those skilled in the art will recognize many modifications may be made to this configuration without departing from the scope of the present invention.

In preferred embodiments, the error and parity checking logic was implemented for separate line work and contone decompression parts. However, in alternative embodiments, the same error and parity checking logic may be applied to all raster objects.

In preferred embodiments, the raster objects had specific information, such as the object type, sequence number, etc., used to determine whether objects were received in the correct order. In alternative embodiments, further or modified information may be included in the raster objects to ensure that raster objects are processed in the correct order. Further there may be different or additional object types other than those discussed herein.

In preferred embodiments, the error and parity checking logic and CPU performing certain raster image processor operations, such as generating the raster objects including the object type and sequence information as well as pixel information, are on separate cards on the same backplane. In further embodiments, certain operations described as performed in the CIC card logic may be performed in the raster image processor. Further, the CIC card may be implemented in hardware other than a PCI card on the printer controller backplane. Still further, operations described as performed in the raster image processor may be moved to the CIC card or alternative raster logic.

Preferred embodiments described error and parity checking of raster objects for a print job. However, in further embodiments, the error and parity checking of the preferred embodiments may apply to raster output other than printer output, such as a computer display device or other raster display.

In summary, preferred embodiments disclose a method, system, and program for error checking raster objects including pixel information for a print job. A plurality of raster objects form the print job. A raster object is received including sequence information indicating an ordering of the raster object with respect to other raster objects in the print job. A determination is made from the sequence information as to whether the raster object is received in a correct order with respect to other raster objects in the print job. This ensures that the pixel information for the raster object is intended for a current pixel line being processed. An indication of error status is made if the sequence information indicates that the raster object was not received in the correct order with respect to the other raster objects in the print job.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for error checking raster objects including pixel information for a print job, wherein a plurality of raster objects form the print job, comprising:

receiving a raster object including sequence information indicating an ordering of the raster object with respect to other raster objects in the print job;

determining from the sequence information for the received raster object and a previously received object whether the received raster object is received in a correct order with respect to other raster objects in the print job, to ensure that the pixel information for the raster object is intended for a current pixel line being processed; and indicating an error status if the sequence information indicates that the raster object was not received in the correct order with respect to the other raster objects in the print job.

2. The method of claim 1, wherein the sequence information includes object type information indicating whether the raster object is one of a first, next, and last raster objects on a sheet, wherein the print job is comprised of multiple sheets, and wherein determining from the sequence information whether the raster object is received in the correct order further comprises:

buffering the object type information for a previously received raster object, wherein the raster object subject to error checking is a current raster object; and comparing the object type information from the previously received raster object and the object type information of the current raster object to determine whether the raster object is received in the correct order, wherein the raster object is received in the correct order if the object type information indicates one of the following conditions exist: (i) the current raster object is the first raster object on the sheet and the previous raster object is the last raster object on the sheet; (ii) the current raster object is the last raster object on the sheet and the previous raster object is the first or next raster object on the sheet; (iii) the current raster object is the next raster object on the sheet and the previous raster object is the first raster object on the sheet; and (iv) both the current and previous raster objects are next raster objects on the sheet.

3. The method of claim 2, wherein the sequence information further includes a sequence number indicating the ordering of raster objects on a sheet, wherein determining from the sequence information whether the current raster object is received in the correct order further comprises:

checking whether the sequence number of the current raster object is a first sequence number on the sheet if the object type information indicates that the current raster object is the first raster object on the sheet, wherein the current raster object is received in the correct order if the sequence number is the first sequence number; and checking whether the sequence number of the current raster object follows the sequence number of the previous raster object if the object type information indicates that the current raster object is the next or last raster object on the sheet, wherein the current raster object is received in the correct order if the sequence number of the raster object follows the sequence number of the previous raster object.

4. The method of claim 2, wherein the object type information indicates whether to print blank for the remainder of the sheet, wherein a current raster object received after a previous raster including object type information indicating to print blank for the remainder of the sheet is in the correct order if the object type information of the current raster object indicates that the current raster object is one of: (i) the first raster object on the sheet and (ii) an only raster object on the sheet.

5. The method of claim 1, further comprising transmitting the raster object to a decompressor to further process the raster object after performing the error checking.

6. The method of claim 5, wherein each raster object includes pixel information for one color component of a scan line printed by a printer, and wherein all the raster objects that include pixel information for the different color components of a same scan line include sequence information indicating that the raster objects on the same scan line are consecutive with respect to each other, wherein the raster objects including the pixel information for the different color components of the same scan line are transmitted to the decompressor after the error checking to be sent to the printer to print before the raster objects of following scan lines are error checked.

7. The method of claim 1, wherein the raster object and sequence information therein is generated by a raster image processor, further comprising:

sending an error message to the raster image processor that one raster object was processed out of sequence if the error status is indicated; and regenerating, with the raster image processor, all the raster objects in the sheet for which the error message was generated.

8. A method for error checking raster objects including pixel information for a print job, wherein a plurality of raster objects form the print job, comprising:

receiving a raster object including sequence information indicating an ordering of the raster object with respect to other raster objects in the print job by:
  (i) receiving an address of the first raster object on the sheet in memory;
  (ii) using the address to access the first raster object from the memory, wherein each raster object on a sheet includes an address of the next raster object on the sheet; and
  (iii) after error checking one raster object on the sheet, obtaining the address in the memory of the next raster object on the sheet from the checked raster object, wherein the obtained address is used to access a next raster object on the sheet from the memory determining from the sequence information whether the raster object is received in a correct order with respect to other raster objects in the print job, thereby ensuring that the pixel information for the raster object is intended for a current pixel line being processed; and indicating an error status if the sequence information indicates that the raster object was not received in the correct order with respect to the other raster objects in the print job.

9. A system for error checking raster objects including pixel information for a print job, wherein a plurality of raster objects form the print job, comprising:

means for receiving a raster object including sequence information indicating an ordering of the raster object with respect to other raster objects in the print job;

means for determining from the sequence information for the received raster object and a previously received object whether the received raster object is received in a correct order with respect to other raster objects in the print job to ensure that the pixel information for the raster object is intended for a current pixel line being processed; and means for indicating an error status if the sequence information indicates that the raster object was not received in the correct order with respect to the other raster objects in the print job.

10. The system of claim 9, wherein the sequence information includes object type information indicating whether the raster object is one of a first, next, and last raster objects on a sheet, wherein the print job is comprised of multiple sheets, and wherein the means for determining from the sequence information whether the raster object is received in the correct order further comprises:

means for buffering the object type information for a previously received raster object, wherein the raster object subject to error checking is a current raster object; and means for comparing the object type information from the previously received raster object and the object type information of the current raster object to determine whether the raster object is received in the correct order, wherein the raster object is received in the correct order if the object type information indicates one of the following conditions exist: (i) the current raster object is the first raster object on the sheet and the previous raster object is the last raster object on the sheet; (ii) the current raster object is the last raster object on the sheet and the previous raster object is the first or next raster object on the sheet; (iii) the current raster object is the next raster object on the sheet and the previous raster object is the first raster object on the sheet; and (iv) both the current and previous raster objects are next raster objects on the sheet.

11. The system of claim 10, wherein the sequence information further includes a sequence number indicating the ordering of raster objects on a sheet, wherein the means for determining from the sequence information whether the current raster object is received in the correct order further comprises:

means for checking whether the sequence number of the current raster object is a first sequence number on the sheet if the object type information indicates that the current raster object is the first raster object on the sheet, wherein the current raster object is received in the correct order if the sequence number is the first sequence number; and means for checking whether the sequence number of the current raster object follows the sequence number of the previous raster object if the object type information indicates that the current raster object is the next or last raster object on the sheet, wherein the current raster object is received in the correct order if the sequence number of the raster object follows the sequence number of the previous raster object.

12. The system of claim 10, wherein the object type information indicates whether to print blank for the remainder of the sheet, wherein a current raster object received after a previous raster including object type information indicating to print blank for the remainder of the sheet is in the correct order if the object type information of the current raster object indicates that the current raster object is one of: (i) the first raster object on the sheet and (ii) an only raster object on the sheet.

13. The system of claim 9, further comprising means for transmitting the raster object to a decompressor to further process the raster object after performing the error checking.

14. The system of claim 13, wherein each raster object includes pixel information for one color component of a scan line printed by a printer, and wherein all the raster objects that include pixel information for the different color components of a same scan line include sequence information indicating that the raster objects on the same scan line are consecutive with respect to each other, wherein the raster objects including the pixel information for the different color components of the same scan line are transmitted to the decompressor after the error checking to be sent to the printer to print before the raster objects of following scan lines are error checked.

15. The system of claim 9, wherein the raster object and sequence information therein is generated by a raster image processor, further comprising:

means for sending an error message to the raster image processor that one raster object was processed out of sequence if the error status is indicated; and means for regenerating, with the raster image processor, all the raster objects in the sheet for which the error message was generated.

16. A system for error checking raster objects including pixel information for a print job, wherein a plurality of raster objects form the print job, comprising:

means for receiving a raster object including sequence information indicating an ordering of the raster object with respect to other raster objects in the print job by performing:
(i) receiving an address of the first raster object on the sheet in memory;
(ii) using the address to access the first raster object from the memory,
wherein each raster object on a sheet includes an address of the next raster object on the sheet;
(iii) after error checking one raster object on the sheet, obtaining the address in the memory of the next raster object on the sheet from the checked raster object, wherein the obtained address is used to access a next raster object on the sheet from the memory means for determining from the sequence information whether the raster object is received in a correct order with respect to other raster objects in the print job, thereby ensuring that the pixel information for the raster object is intended for a current pixel line being processed; and means for indicating an error status if the sequence information indicates that the raster object was not received in the correct order with respect to the other raster objects in the print job.

17. An article of manufacture for use in error checking raster objects including pixel information for a print job, wherein a plurality of raster objects form the print job, the article of manufacture comprising logic for performing:

receiving a raster object including sequence information indicating an ordering of the raster object with respect to other raster objects in the print job;

determining from the sequence information for the received raster object and a previously received object whether the received raster object is received in a correct order with respect to other raster objects in the print job to ensure that the pixel information for the raster object is intended for a current pixel line being processed; and indicating an error status if the sequence information indicates that the raster object was not received in the correct order with respect to the other raster objects in the print job.

18. The article of manufacture of claim 17, wherein the sequence information includes object type information indicating whether the raster object is one of a first, next, and last raster objects on a sheet, wherein the print job is comprised of multiple sheets, and wherein determining from the sequence information whether the raster object is received in the correct order further comprises:

buffering the object type information for a previously received raster object, wherein the raster object subject to error checking is a current raster object; and comparing the object type information from the previously received raster object and the object type information of the current raster object to determine whether the raster object is received in the correct order, wherein the raster object is received in the correct order if the object type information indicates one of the following conditions exist: (i) the current raster object is the first raster object on the sheet and the previous raster object is the last raster object on the sheet; (ii) the current raster object is the last raster object on the sheet and the previous raster object is the first or next raster object on the sheet; (iii) the current raster object is the next raster object on the sheet and the previous raster object is the first raster object on the sheet; and (iv) both the current and previous raster objects are next raster objects on the sheet.

19. The article of manufacture of claim 18, wherein the sequence information further includes a sequence number indicating the ordering of raster objects on a sheet, wherein determining from the sequence information whether the current raster object is received in the correct order further comprises:

checking whether the sequence number of the current raster object is a first sequence number on the sheet if the object type information indicates that the current raster object is the first raster object on the sheet, wherein the current raster object is received in the correct order if the sequence number is the first sequence number; and checking whether the sequence number of the current raster object follows the sequence number of the previous raster object if the object type information indicates that the current raster object is the next or last raster object on the sheet, wherein the current raster object is received in the correct order if the sequence number of the raster object follows the sequence number of the previous raster object.

20. The article of manufacture of claim 18, wherein the object type information indicates whether to print blank for the remainder of the sheet, wherein a current raster object received after a previous raster including object type information indicating to print blank for the remainder of the sheet is in the correct order if the object type information of the current raster object indicates that the current raster object is one of: (i) the first raster object on the sheet and (ii) an only raster object on the sheet.

21. The article of manufacture of claim 17, further comprising transmitting the raster object to a decompressor to further process the raster object after performing the error checking.

22. The article of manufacture of claim 17, wherein the raster object and sequence information therein is generated by a raster image processor, further comprising:

sending an error message to the raster image processor that one raster object was processed out of sequence if the error status is indicated; and regenerating, with the raster image processor, all the raster objects in the sheet for which the error message was generated.

23. An article of manufacture for use in error checking raster objects including pixel information for a print job, wherein a plurality of raster objects form the print job, wherein a pluralty of raster objects form the print job, the article of manufacture comprising logic for performing:

receiving a raster object including sequence information indicating an ordering of the raster object with respect to other raster objects in the print job by:

(i) receiving an address of the first raster object on the sheet in memory;

(ii) using the address to access the first raster object from the memory, wherein each raster object on a sheet includes an address of the next raster object on the sheet; and (iii) after error checking one raster object on the sheet, obtaining the address in the memory of the next raster object on the sheet from the checked raster object, wherein the obtained address is used to access a next raster object on the sheet from the memory determining from the sequence information whether the raster object is received in a correct order with respect to other raster objects in the print job, thereby ensuring that the pixel information for the raster object is intended for a current pixel line being processed; and indicating an error status if the sequence information indicates that the raster object was not received in the correct order with respect to the other raster objects in the print job.

24. An article of manufacture for use in error checking raster objects including pixel information for a print job, wherein a plurality of raster objects form the print job, the article of manufacture comprising logic for performing:

receiving a raster object including sequence information indicating an ordering of the raster object with respect to other raster objects in the print job;

determining from the sequence information whether the raster object is received in a correct order with respect to other raster objects in the print job, thereby ensuring that the pixel information for the raster object is intended for a current pixel line being processed; and indicating an error status if the sequence information indicates that the raster object was not received in the correct order with respect to the other raster objects in the print job, wherein each raster object includes pixel information for one color component of a scan line printed by a printer, and wherein all the raster objects that include pixel information for the different color components of a same scan line include sequence information indicating that the raster objects on the same scan line are consecutive with respect to each other, wherein the raster objects including the pixel information for the different color components of the same scan line are transmitted to the decompressor after the error checking to be sent to the printer to print before the raster objects of following scan lines are error checked.

25. A computer readable medium containing at least one data structure associated with each raster object including pixel information for a print job for error checking each raster object, wherein a plurality of raster objects form the print job, and wherein the at least one data structure associated with each raster object comprises:

sequence information indicating an ordering of the raster object with respect to other raster objects in the print job, wherein the sequence information for a received raster object and a previously received object is used to determine whether the received raster object is received in a correct order with respect to other raster objects in the print job to ensure that the pixel information for the raster object is intended for a current pixel line being processed.

26. The computer readable medium of claim 25, wherein the sequence information includes object type information indicating whether the raster object is one of a first, next, and last raster objects on a sheet, wherein the print job is comprised of multiple sheets, and wherein the object type information from a previously received raster object and the object type information of a current raster object is compared to determine whether the current raster object is received in the correct order, wherein the current raster object is received in the correct order if the object type information indicates one of the following conditions exist: (i) the current raster object is the first raster object on the sheet and the previous raster object is the last raster object on the sheet; (ii) the current raster object is the last raster object on the sheet and the previous raster object is the first or next raster object on the sheet; (iii) the current raster object is the next raster object on the sheet and the previous raster object is the first raster object on the sheet; and (iv) both the current and previous raster objects are next raster objects on the sheet.

27. The computer readable medium of claim 26, wherein the sequence information further includes a sequence number indicating the ordering of raster objects on a sheet, wherein the sequence number of the current raster object is a first sequence number on the sheet if the object type information indicates that the current raster object is the first raster object on the sheet, wherein the current raster object is received in the correct order if the sequence number is the first sequence number and if the object type information indicates that the current raster object is the next or last raster object on the sheet, wherein the current raster object is received in the correct order if the sequence number of the raster object follows the sequence number of the previous raster object.

28. A computer readable medium containing at least one data structure associated with each raster object including pixel information for a print job for error checking each raster object, wherein a plurality of raster objects form the print job, and wherein the at least one data structure associated with each raster object comprises:

sequence information indicating an ordering of the raster object with respect to other raster objects in the print job, wherein the sequence information is used to determine whether the raster object is received in a correct order with respect to other raster objects in the print job, thereby ensuring that the pixel information for the raster object is intended for a current pixel line being processed, wherein each raster object includes pixel information for one color component of a scan line printed by a printer, and wherein all the raster objects that include pixel information for the different color components of a same scan line include sequence information indicating that the raster objects on the same scan line are consecutive with respect to each other.

* * * * *